United States Patent [19]

Smith

[11] Patent Number: 5,884,656
[45] Date of Patent: Mar. 23, 1999

[54] PIG LAUNCHER

[75] Inventor: Brian Smith, Notts, United Kingdom

[73] Assignee: Plenty Limited, Berkshire, United Kingdom

[21] Appl. No.: 44,724

[22] Filed: Mar. 19, 1998

[30] Foreign Application Priority Data

Mar. 20, 1997 [EP] European Pat. Off. .............. 97301888

[51] Int. Cl.⁶ .................................................... B08B 9/04
[52] U.S. Cl. ..................................... 137/268; 15/104.062
[58] Field of Search ...................... 137/268; 15/104.061, 15/104.062

[56] References Cited

U.S. PATENT DOCUMENTS

| | | | |
|---|---|---|---|
| 3,218,659 | 11/1965 | Rowley | 137/268 X |
| 3,322,140 | 5/1967 | Scott | 137/268 |
| 3,322,197 | 5/1967 | Baker et al. | 137/268 X |
| 3,779,270 | 12/1973 | Davis | 137/268 |
| 4,401,133 | 8/1983 | Lankston | 137/268 |
| 4,709,719 | 12/1987 | Littleton et al. | |

FOREIGN PATENT DOCUMENTS

| | | |
|---|---|---|
| 2026647 | 2/1980 | United Kingdom . |
| 2195740 | 4/1988 | United Kingdom . |
| 2195739 | 4/1988 | United Kingdom . |

*Primary Examiner*—Kevin Lee
*Attorney, Agent, or Firm*—Frost & Jacobs LLP

[57] ABSTRACT

A pig launcher (10, 38) comprises a cassette (12, 41) adapted to receive at least one pig (14, 16, 18, 20) and a latch mechanism (28a, 28b, 28c, 28d, 42a, 42b, 42c) comprising a latch member (30, 46). The latch member is movable from a first protruded position wherein the latch member restricts movement of the pig relative to the cassette in a launch direction to a second retracted position wherein the latch member does not restrict movement of the pig in the launch direction. The pig launcher also comprises a flow control valve (30, 32, 35, 36, 44a, 44b, 44c, 48) which is adapted to pass fluid into the cassette when in an open state and to restrict flow of fluid into the cassette when in a closed state. The arrangement is such that the latch mechanism and the flow control valve are operatively associated with each other so that when the latch member moves from the first protruded position to the second retracted position the flow control valve simultaneously moves from the open state to the closed state.

11 Claims, 4 Drawing Sheets

PIG LAUNCHER

The present invention relates to a pig launcher.

It is known to provide a pig launcher for launching pigs into a pipeline which comprises a cassette adapted to receive at least one pig and a mechanism for controllably launching the pigs by redirecting the flow of a fluid to the cassette. It is also known to provide such pig launchers with pig stops or latches which ensure that the pigs are not launched before desired.

However, such pig launchers which comprise both a fluid control mechanism and a series of latches are complicated and require both means for controlling operation of the fluid control mechanism and means for controlling operation of the latches in order to correctly launch a pig.

In accordance with the present invention there is provided a pig launcher comprising a cassette adapted to receive at least one pig and a latch mechanism comprising a latch member movable from a first protruded position wherein the latch member restricts movement of the pig relative to the cassette in a launch direction to a second retracted position wherein the latch member does not restrict movement of the pig in the launch direction, and flow control means adapted to pass fluid into the cassette when in an open state and to restrict flow of fluid into the cassette when in a closed state, the arrangement being such that the latch mechanism and the flow control means are operatively associated with each other so that when the latch member moves from the first protruded position to the second retracted position the flow control means simultaneously moves from the open state to the closed state.

In a preferred embodiment, the flow control means forms part of the latch member.

Preferably, the latch mechanism further comprises a housing adapted to slidably receive the latch member, the housing comprising a fluid inlet and the flow control means comprising a recess in the latch member and a latch aperture in communication with the recess, the latch aperture aligning with the fluid inlet when the latch member is in the first protruded position and the latch aperture not aligning with the fluid inlet when the latch member is in the second retracted position.

In another preferred embodiment, the latch mechanism further comprises a sleeve adapted to rotate relative to the cassette from a first position to a second position, the sleeve urging the latch member to the first protruded position when the sleeve is in the first position and the sleeve urging the latch member to the second retracted position when the sleeve is in the second position.

Preferably, the flow control means comprises at least one aperture in the sleeve and at least one corresponding aperture in the cassette, the sleeve aperture aligning with the said cassette aperture when the sleeve is in the first position and the sleeve aperture not aligning with the cassette aperture when the sleeve is in the second position.

Preferably, the pig launcher further comprises a barrel adapted to receive the cassette, the barrel having a fluid inlet and the size of the barrel being such that a cavity exists between the cassette and the barrel, the cavity carrying fluid from the fluid inlet to the apertures.

Additionally, the latch member may be pivotable about an axis between the first protruded position and the second retracted position, and the latch member may be mounted in an aperture in the cassette, the size of which aperture substantially corresponds to the size of the latch member so that when the latch member is in the first protruded position the aperture is open and when the latch member is in the second retracted position the latch member is closed.

Preferably, the flow control means continues to pass fluid at least until the latch member is sufficiently retracted to allow the pig to move past the latch member. This prevents the latch member from becoming damaged due to the creation of a pressure differential across a pig before the latch member is fully withdrawn.

Preferably, the pig launcher comprises at least one actuator, each actuator cooperating with a latch mechanism so as to effect movement of the latch member from the first protruded position to the second retracted position.

Preferably, the actuator is operable by electrical, hydraulic or pneumatic means.

The actuator may also be manually operable or adapted to be operated by a remote operated vehicle.

Specific embodiments of the present invention are now described by way of example only, with reference to the accompanying drawings, in which.

Figure 1:
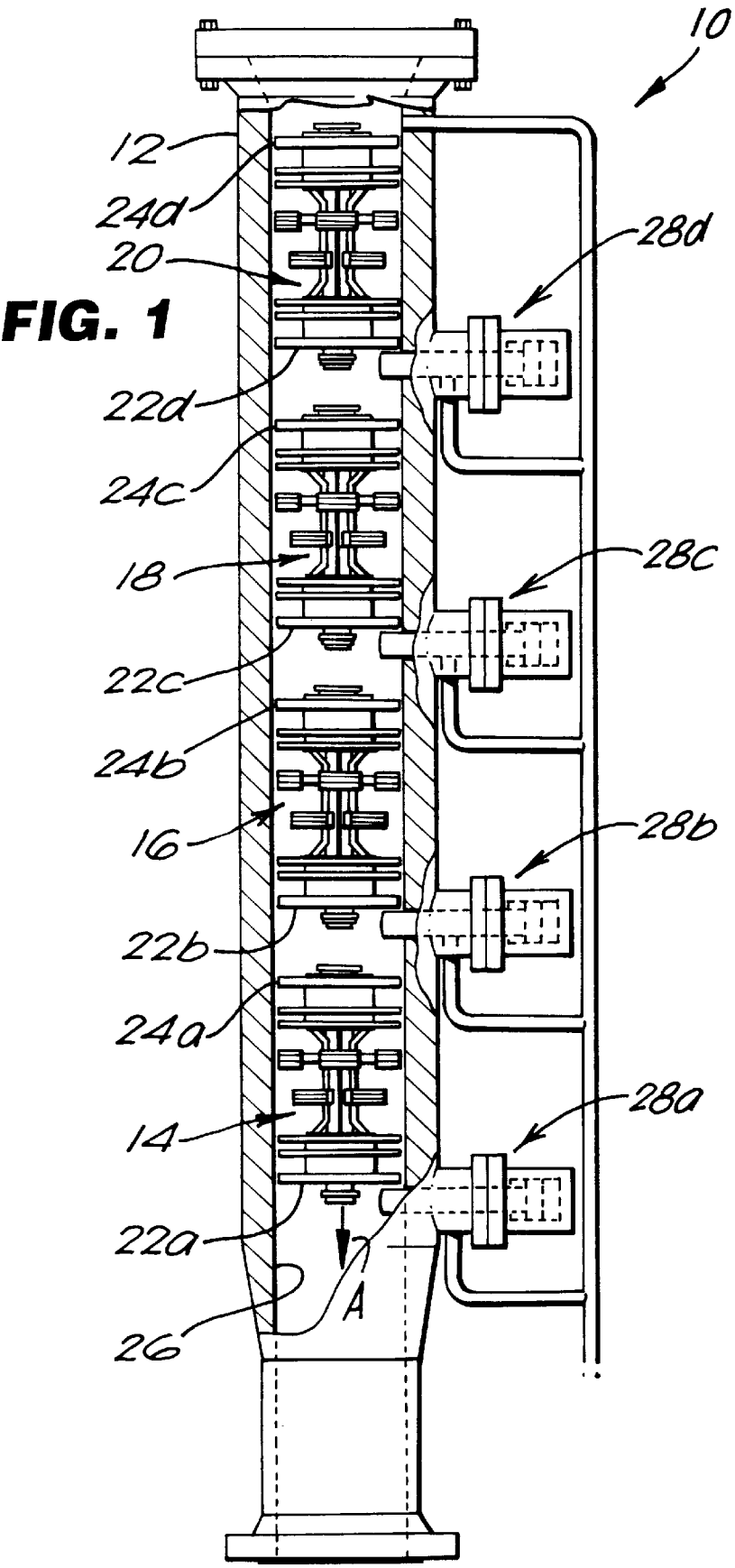
FIG. 1 is a diagrammatic representation of an embodiment of a pig launcher in accordance with the present invention.
Figure 2:
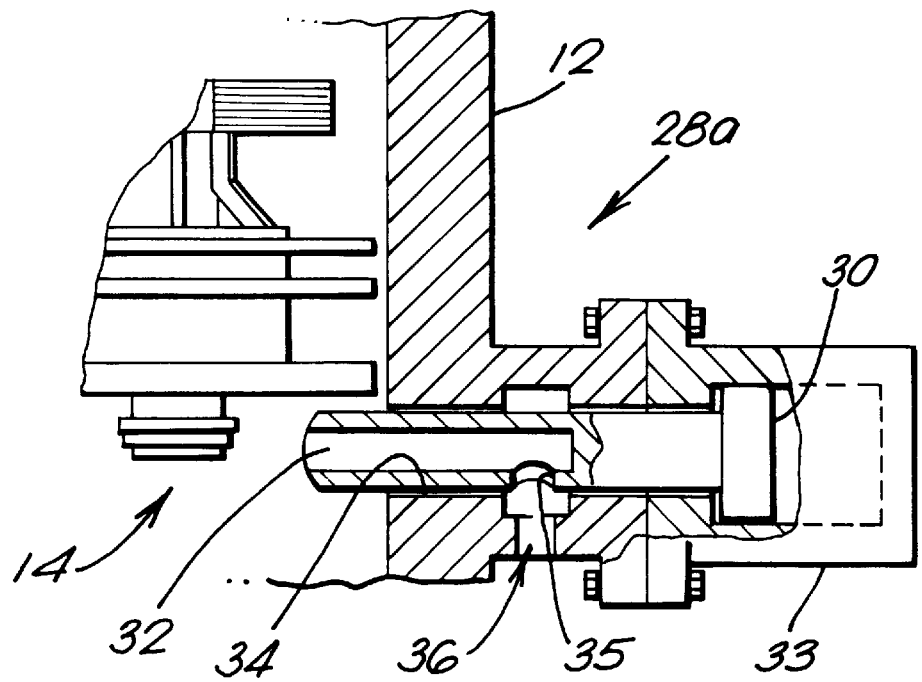
FIG. 2 is a diagrammatic representation of a latch mechanism of the pig launcher shown in FIG. 1 with a latch member of the latch mechanism in a first position.

Referring to the drawings, there is shown in FIG. 1 an embodiment of a pig launcher (10) having a cassette (12) which is adapted to accept at least one pig (14, 16, 18, 20). Each pig includes a front disc (22a, 22b, 22c, 22d) and a back disc (24a, 24b, 24c, 24d), the front and back discs being shaped so that circumferential ends of the front and back discs contact an internal surface (26) of the cassette (12). The discs may form a tight seal with the internal surface of the cassette.

The pig launcher (10) also comprises latch mechanisms (28a, 28b, 28c, 28d) which control launching of the pigs. Each latch mechanism comprises a latch member (30) which is slidably received in a housing (33) integral with a wall of the cassette (12). The latch member extends through a cassette aperture (34) located in the cassette wall and the latch member is movable relative to the housing (33) and the cassette aperture (34) from a first protruded position where the latch member protrudes into the interior of the cassette to a second retracted position where the latch member does not protrude into the interior of the cassette. The latch member comprises an elongate recess (32) which is in communication with a latch aperture (35) provided in a wall of the latch member (30), the latch aperture (35) being located at an end of the elongate recess (32) remote from the interior of the cassette (12).

The housing (33) includes a fluid inlet (36) which is located in a wall of the housing (33) so that when the latch member (30) is in the first protruded position the path is free for fluid to flow from the fluid inlet (36) through the latch aperture (35) and elongate recess (32) and into the interior of the cassette (12). The housing (33) and fluid inlet (36) are also configured such that when the latch member is in the second retracted position the latch aperture (35) and the fluid inlet (36) are not aligned and fluid cannot flow into the elongate recess (32) via the fluid inlet (36).

Operation of the pig launcher is as follows. In standby mode the latch members (30) of the latch mechanisms (28a, 28b, 28c, 28d) are all in the first protruded position as shown in FIG. 1 and the fluid inlets (36) and the latch apertures (35) are aligned with each other. Fluid is free to pass from the fluid inlets (36) through the elongate recesses (32) and into the interior of the cassette (12). With all the latch members in the first position each pig (14, 16, 18, 20) is prevented from moving in a launch direction A and the fluid path through each latch mechanism is open. As a result, a pressure balance exists across each pig. The path of least resistance for the fluid is through the latch member (30) of the first latch mechanism (28a), and most of the fluid flows through this first latch mechanism and away from the pigs.

Figure 3:
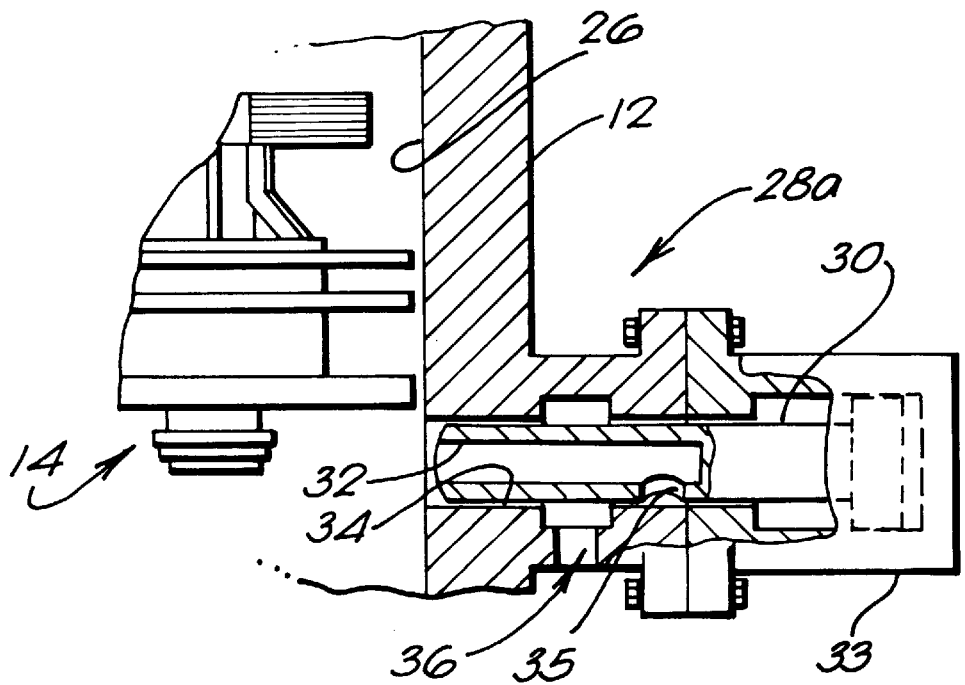
FIG. 3 is a diagrammatic representation of the latch mechanism shown in FIG. 2 with the latch member in a second position.

When it is desired to launch a pig, the latch member (30) of the first latch mechanism (28a) is moved to the second retracted position shown in FIG. 3 by operation of an actuator (not shown). The first pig (14) then becomes free to move in the launch direction A. In addition, as the latch member (30) moves to the second position the flow of fluid through the first latch member is simultaneously restricted. As a result, fluid flow is directed through the second (28b), third (28c) and fourth (28d) latch mechanisms and a pressure differential is created across the first pig (14), with a relatively low pressure area existing adjacent the front disc (22a) and a relatively high pressure area existing adjacent the rear disc (24a). Consequently, the first pig is forced through the cassette (12) in the launch direction A.

The second (16), third (18) and fourth (20) pigs are launched in the same way. For example, to launch the second pig (16) the latch member (30) of the second latch mechanism (28b) is moved to the second retracted position, thereby simultaneously restricting the flow of fluid through the second latch mechanism and creating a pressure differential across the second pig. This pressure differential then forces the second pig to move in the launch direction A.

Figure 4:
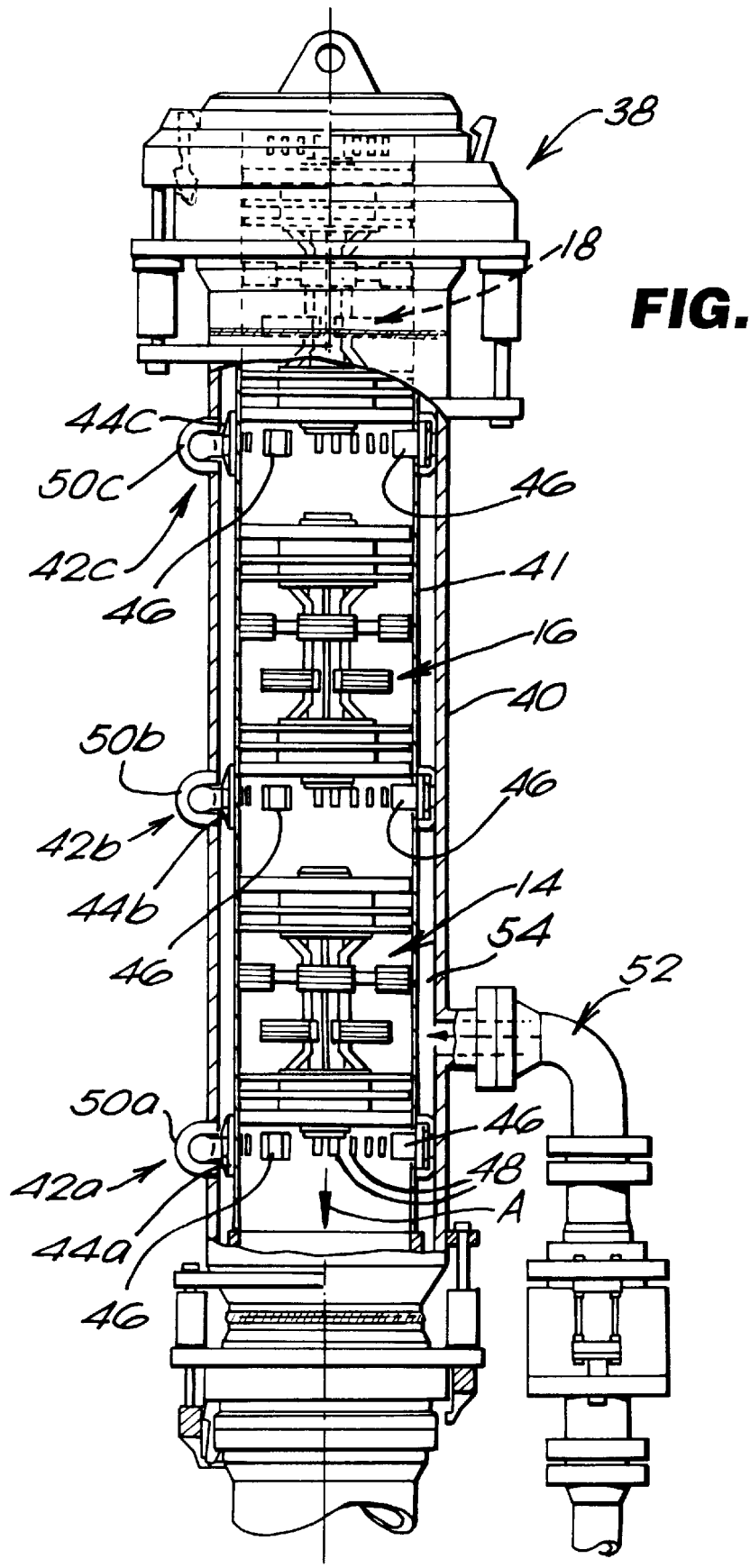
FIG. 4 is a diagrammatic representation of an alternative embodiment of a pig launcher in accordance with the present invention.
Figure 5:
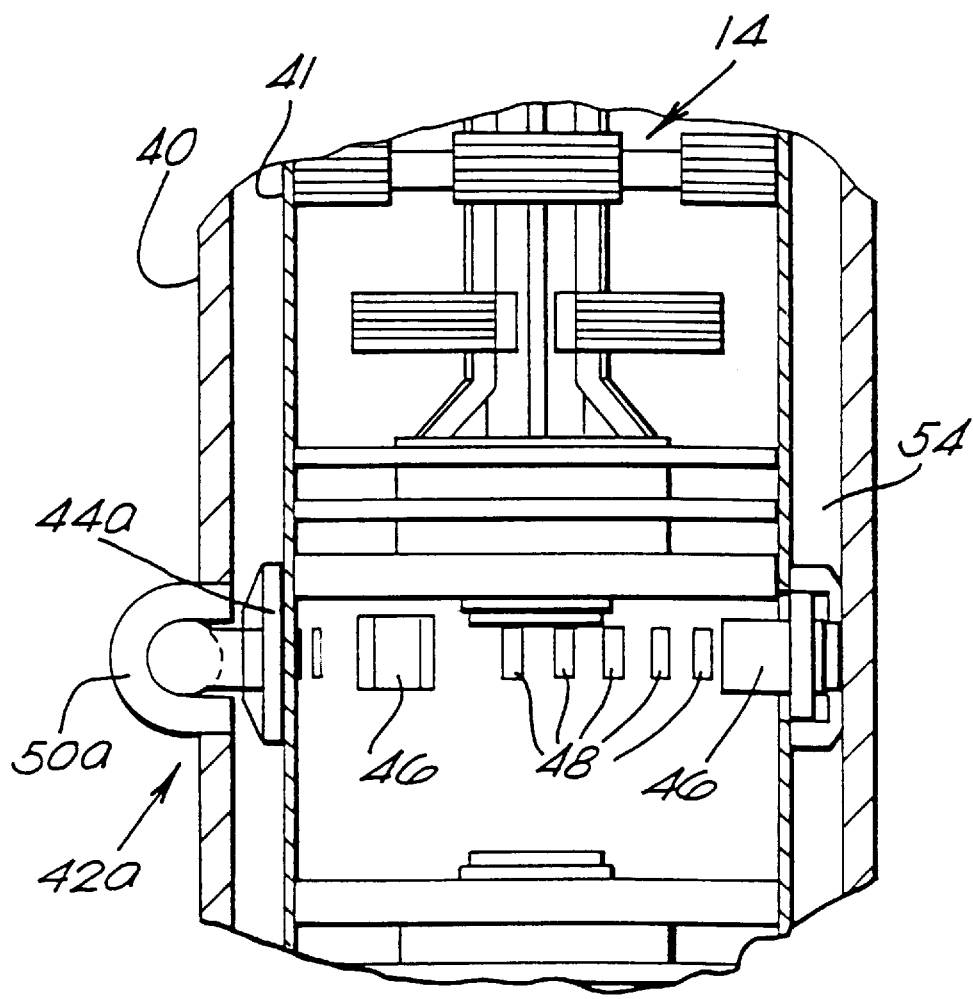
FIG. 5 is a diagrammatic representation of a latch mechanism of the pig launcher shown in FIG. 4.

An alternative embodiment of the pig launcher is shown in FIG. 4. The pig launcher (38) comprises a barrel (40) which accommodates a cassette (41) adapted to receive at least one pig (14, 16, 18). The cassette and pig arrangement of this embodiment is similar to the cassette and pig arrangement of the embodiment shown in FIG. 1, except that different latch mechanisms (42a, 42b, 42c) are used.

Each of the latch mechanisms (42a, 42b, 42c) comprises a sleeve (44a, 44b, 44c) and three latch members (46). The latch members (46) are movable from a first protruded position where a portion of the latch member protrudes into the interior of the cassette (41) and thereby restricts movement of the adjacent pig in the launch direction A to a second retracted position where the pig is free to move in the launch direction A. The sleeve (44a, 44b, 44c) is provided with apertures (not shown) and the cassette (41) is also provided with apertures (48). The sleeve is rotatable about an axis parallel to the launch direction A in response to an actuator (50a, 50b, 50c). The arrangement is such that the sleeve is rotatable from a first position to a second position. In the first position the apertures in the sleeve align with the apertures (48) in the cassette (41) and the sleeve cooperates with the latch members (46) so as to urge the latch members to the first protruded position. In the second position the apertures in the sleeve and the apertures (48) are not aligned and the sleeve cooperates with the latch member so as to urge the latch members to the second retracted position. In order for the latch members to move from the first protruded position to the second retracted position, each latch member (46) may be pivotably mounted on an axis.

Operation of the pig launcher (38) is as follows. In standby mode the sleeves (44a, 44b, 44c) are in the first position with the latch members (46) extending into the interior of the cassette (41) to restrict movement of the pigs in the launch direction A and the apertures in the sleeve (44a, 44b, 44c) and the cassette (41) being aligned. Fluid flows through an inlet (52) and into a cavity (54) between the cassette (41) and the barrel (40). Since the apertures of each of the sleeves are aligned with the apertures (48) in the cassette (41), an approximate pressure balance exists across each pig. The majority of the fluid passes through the apertures (48) in the first latch mechanism (42a) since this is the path of least resistance. When it is desired to launch a pig, the first actuator (50a) is activated and the first sleeve (44a) rotates from the first position to the second position. As a result, the latch member (46) of the first latch mechanism (42a) is withdrawn from the interior of the cassette (41) and the apertures in the sleeve and the cassette move out of alignment with each other, thereby restricting flow of fluid through the first latch mechanism (42a). A pressure differential is built up across the first pig (14) as a consequence and the first pig (14) moves in the launch direction A.

The second (16) and third (18) pigs are launched in the same way. For example, when it is desired to launch the second pig (16) the second actuator (50b) is activated.

As an alternative or in addition to the apertures in the sleeves and cassette, in order to control fluid flow into the cassette each latch member (46) may be located in an aperture of the sleeve, the latch member opening the aperture when the latch member is in the first position and closing the aperture when the latch member is in the second position.

It will be appreciated that since both embodiments include means for preventing movement of the pigs in a launch direction and utilise fluid to force the pigs in the launch direction, both embodiments may be used for both horizontal and vertical operations.

It will also be appreciated that both embodiments are suitable for use on both surface and subsea installations.

Furthermore, it will be appreciated that the actuators in both embodiments may be operated manually, by a remote operated vehicle (ROV), or by electrical, hydraulic, pneumatic or other means.

It will also be appreciated that the latch mechanisms may be configured so that fluid continues to pass through a latch mechanism and into the cassette at least until the latch member of the latch mechanism is sufficiently retracted to allow a pig to move past the latch member.

It will be appreciated that by machining the latch mechanisms to low tolerance levels, the need for additional seals to aid restriction of the flow of fluid is avoided. Such machining also increases the tolerance of the pig launcher to fluid contaminants.

It will of course be understood that the present invention has been described above purely by way of example, and that modification of detail can be made within the scope of the invention.

I claim:

1. A pig launcher (10, 38) comprising a cassette (12, 41) adapted to receive at least one pig (14, 16, 18, 20) and a latch mechanism (28a, 28b, 28c, 28d, 42a, 42b, 42c) comprising a latch member movable from a first protruded position wherein the latch member (30, 46) restricts movement of the pig relative to the cassette (12, 41) in a launch direction (A) to a second retracted position wherein the latch member (30, 46) does not restrict movement of the pig (14, 16, 18, 20) in the said launch direction, and flow control means (30, 32, 35, 36, 44a, 44b, 44c, 48) adapted to pass fluid into the cassette (12, 41) when in an open state and to restrict flow of fluid into the cassette when in a closed state, characterised in that the latch mechanism and the flow control means are operatively associated with each other so that when the latch member (30, 46) moves from the first protruded position to the second retracted position the flow control means (30, 32, 35, 36, 44a, 44b, 44c, 48) simultaneously moves from the open state to the closed state.

2. A pig launcher (10) as claimed in claim 1, wherein the flow control means (30, 32, 35, 36) forms part of the latch member (30).

3. A pig launcher (10) as claimed in claim 2, wherein the latch mechanism (28a, 28b, 28c, 28d) further comprises a housing (33) adapted to slidably receive the latch member (30), the housing comprising a fluid inlet (36) and the flow control means comprising a recess (32) in the latch member and a latch aperture (35) in communication with the recess (32), the latch aperture (35) aligning with the fluid inlet (36) when the latch member (30) is in the first protruded position and the latch aperture and not aligning with the fluid inlet (36) when the latch member (30) is in the second retracted position.

4. A pig launcher (38) as claimed in claim 1, wherein the latch mechanism (42a, 42b, 42c) further comprises a sleeve (44a, 44b, 44c) adapted to rotate relative to the cassette (41) from a first position to a second position, the sleeve urging the latch member (46) to the first protruded position when the sleeve is in the first position and the sleeve urging the latch member (46) to the second retracted position when the sleeve is in the second position.

5. A pig launcher (38) as claimed in claim 4, wherein the flow control means (44a, 44b, 44c, 48) comprises at least one aperture in the sleeve and at least one corresponding aperture in the cassette (48), the said sleeve aperture aligning with the said cassette aperture (48) when the sleeve (44a, 44b, 44c) is in the first position and the said sleeve aperture not aligning with the said cassette aperture (48) when the sleeve is in the second position.

6. A pig launcher (38) as claimed in claim 5, further comprising a barrel (40) adapted to receive the cassette (41), the barrel (40) having a fluid inlet (52) and the size of the barrel being such that a cavity (54) exists between the cassette (41) and the barrel (40), the cavity (54) carrying fluid from the fluid inlet (52) to the said apertures.

7. A pig launcher (38) as claimed in claim 6, wherein the latch member (46) is pivotable about an axis between the said first protruded position and the said second retracted position, and the latch member (46) is mounted in an aperture in the sleeve, the size of which aperture substantially corresponds to the size of the latch member (46) so that when the latch member is in the first protruded position the aperture is open and when the latch member is in the second position the latch member is closed.

8. A pig launcher (10, 38) as claimed in claim 1, wherein the flow control means continues to pass fluid at least until the latch member (30, 46) is sufficiently retracted to allow the pig (14, 16, 18, 20) to move past the latch member.

9. A pig launcher (10, 38) as claimed in claim 1, further comprising at least one actuator (50a, 50b, 50c), each actuator of which cooperating with a latch mechanism so as to effect movement of the latch member (30, 46) from the first protruded position to the second retracted position.

10. A pig launcher (10, 38) as claimed in claim 9, wherein the actuator (50a, 50b, 50c) is operable by electrical, hydraulic or pneumatic means.

11. A pig launcher (10, 38) as claimed in claim 9, wherein the actuator (50a, 50b, 50c) is manually operable or adapted to be operated by a remote operated vehicle.

* * * * *

UNITED STATES PATENT AND TRADEMARK OFFICE
CERTIFICATE OF CORRECTION

PATENT NO. : 5,884,656
DATED : March 23, 1999
INVENTOR(S) : Brian Smith

It is certified that error appears in the above-indentified patent and that said Letters Patent is hereby corrected as shown below:

Column 1, between lines 2 and 3, please insert -- BACKGROUND OF THE INVENTION --

Column 1, between lines 14 and 15, please insert -- THE INVENTION --

Column 2, between lines 16 and 17, please insert -- BRIEF DESCRIPTION OF THE DRAWINGS --

Column 2, between lines 30 and 31, please insert -- PREFERRED EMBODIMENTS --

Signed and Sealed this

Twenty-first Day of September, 1999

Attest:

Q. TODD DICKINSON

Attesting Officer

Acting Commissioner of Patents and Trademarks